Aug. 31, 1926.

F. LECHNER 1,597,906

FABRICATED STRUCTURE FORMED OF SCRAP LEATHER UNITS

Filed April 10, 1925

INVENTOR
Fulton Lechner.
BY
ATTORNEY

Patented Aug. 31, 1926.

1,597,906

UNITED STATES PATENT OFFICE.

FULTON LECHNER, OF ORWIGSBURG, PENNSYLVANIA.

FABRICATED STRUCTURE FORMED OF SCRAP LEATHER UNITS.

Application filed April 10, 1925. Serial No. 22,168.

The invention resides in the provision of a unique and efficiently useful seat, pillow, cushion or like top structure fabricated by assembling structural units formed from waste scrap of leather, rubber sheeting or the like.

The invention has for its object to provide a structure which may be used as a supporting seat top for chairs or the like or as an encasing cover for cushions or pillows, which is neat and attractive in appearance, strong and durable, and which is particularly economical to manufacture, the latter feature being accentuated by the adaptability of the structure to fabrication by assembly of units formed from waste scraps of material.

With the above and other objects in view that will hereinafter appear, the invention further resides in the novel details of construction, combination and arrangement of parts, all of which will be first fully described in the following detailed description, then be specifically pointed out in the appended claims, reference being had to the accompanying drawing, in which:—

Figure 1:
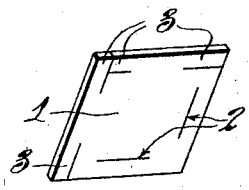
Figure 1 is a detail perspective view of one of the unitary pieces of which the structure is fabricated.

In Figure 1 of the drawing, I have shown one of the unitary pieces, a plurality of which are cooperatively assembled, in a manner soon to be described, to provide the completed seat or cushion top structure desired.

While the pieces may be formed in any desired manner and of any suitable shape or material I preferably die-cut the same from scraps of waste leather or rubber tire inner-tubes in the square shape indicated in the figures of the drawing. The size of the squares is, of course, optional and may be governed by the uses to which the pieces are to be put.

In the drawing, I have indicated the unitary square pieces by the numeral 1. Each piece 1 has two of the edges thereof which meet to form a corner thereof provided with a receiving slit 2 spaced inwardly from and extending parallel to the respective edge and positioned centrally between the two edges which extend from that edge.

Figure 2:
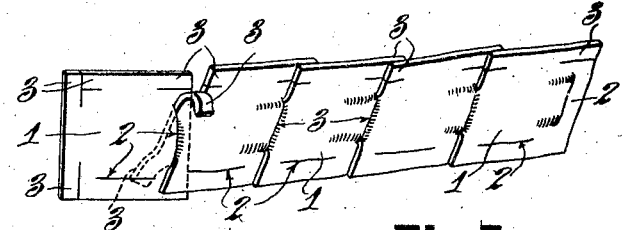
Figure 2 is a detail perspective view illustrating the manner in which the units are assembled to form a longitudinal strip.

The remaining two edges, which meet to form the opposite corner of the piece, are slit from opposite sides in the manner indicated to provide a set (a pair) of securing fingers 3 adapted to be inserted into the receiving slits of certain other pieces 1 to effect an assembly of such units to form a fabricated structure of the class stated, see Figures 1 and 2.

It will be observed, by reference to Figure 1, that the width of the securing fingers 3 and the distance to which the receiving slits 2 are spaced from the respective unit edges are the same; also, that the width of the space between each set or cooperative pair of securing fingers 3 and the length of each receiving slit 2, likewise, are equal. Thus when a plurality of units are assembled, a fabricated structure of the type desired is provided, the component parts of which are symmetrically-cooperatively united, presenting a pleasingly uniform appearance to the observing eye, see Figure 4.

Figure 3:
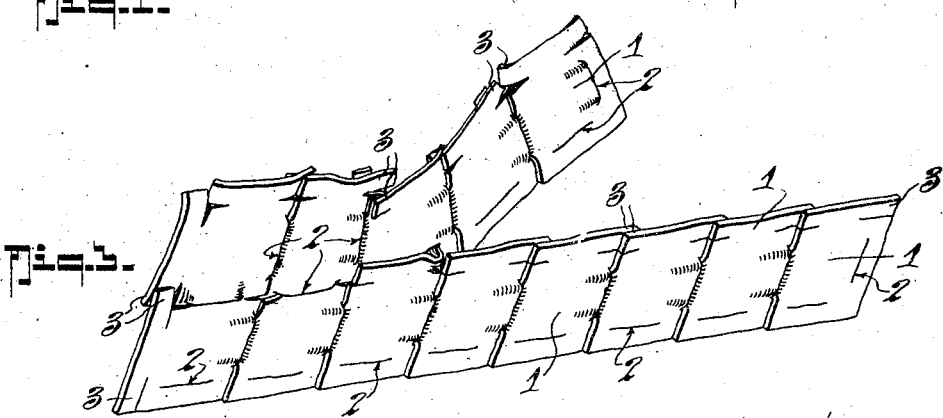
Figure 3 is a detail perspective illustrating the manner in which the longitudinal strips are assembled to form the complete structure.

The units 1 may be assembled by the steps indicated in Figures 2 and 3 of the drawing. The units are first assembled into a longitudinal strip, as indicated in Figure 2, by inserting a set of the fingers 3 of one unit through the adjacent receiving slit 2 of the adjacent unit to secure the said units together. After one strip of the desired length has been assembled another and successive strips may be assembled, after which, the assembled strips are themselves joined and secured together by interlocking the remaining sets of fingers 3 thereof into the remaining slits 2 of adjacent strips in the manner indicated in Figure 3 of the drawing.

Figure 5:
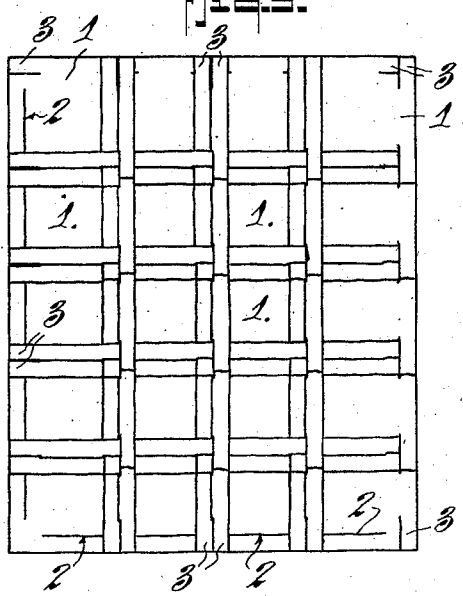
Figures 4 and 5 are top and inverted plan views of a section of a completed structure respectively.
Figure 4:
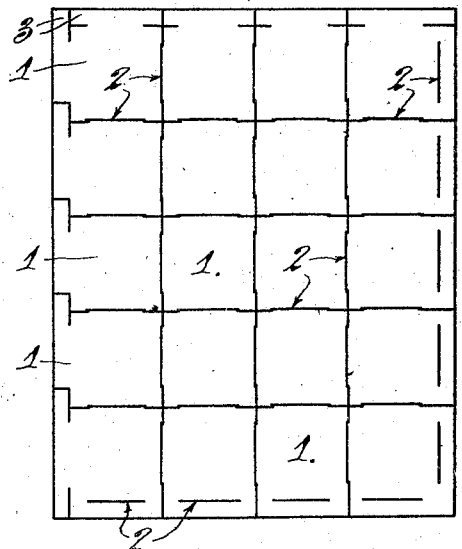

In Figure 4 of the drawings the appearance presented in plan view by a fabricated structure constructed as above described is illustrated and in Figure 5 a similar illustration is made of the inverted plan appearance.

From the foregoing description, taken in connection with the accompanying drawing, it is thought that the novel details of construction, manner of use, and advantages of the invention will be readily understood by those familiar with the use of such structures.

What I claim is:

1. A fabricated structure of the class described comprising a plurality of assembled small rectangular units each having a pair of sets of securing fingers and a pair of finger receiving slits, each set of securing fingers being interlocked with an adjacent slit of an adjacent unit.

2. A fabricated structure of the class described comprising a plurality of assembled rectangular units each having a set of securing fingers formed on each of a pair of edges of the same which join to form a corner thereof and a receiving slit spaced slightly inwardly and parallel to each of the remaining edges thereof, each set of securing fingers being interlocked downwardly through and with an adjacent slit of an adjacent unit.

3. As a new article of manufacture, a structure forming unit comprising a rectangle of relatively thin flexible material having two of the side edges thereof which meet to form one corner of the unit each equipped with a set of securing fingers and the remaining sides thereof each equipped with a receiving slit spaced inward from and parallel to the edges of said remaining sides.

4. As a new article of manufacture, a structure forming unit comprising a rectangle of relatively thin flexible material having two of the side edges thereof which meet to form one corner of the unit each equipped with a set of securing fingers and the remaining sides thereof each equipped with a receiving slit spaced inward from and parallel to the edges of said remaining sides, the width of the securing fingers and the distance to which the receiving slits are spaced from the respective unit edges being equal.

5. As a new article of manufacture, a structure forming unit comprising a rectangle of relatively thin flexible material having two of the side edges thereof which meet to form one corner of the unit each equipped with a set of securing fingers and the remaining sides thereof each equipped with a receiving slit spaced inward from and parallel to the edges of said remaining sides, the width of the space between the individual fingers of each set of securing fingers and the length of each receiving slit being equal.

6. As a new article of manufacture, a structure forming unit comprising a rectangle of relatively thin flexible material having two of the side edges thereof which meet to form one corner of the unit each equipped with a set of securing fingers and the remaining sides thereof each equipped with a receiving slit spaced inward from and parallel to the edges of said remaining sides, the width of the securing fingers and the distance to which the receiving slits are spaced from the respective unit edges being equal, and the width of the space between the individual fingers of each set of securing fingers and the lengths of each receiving slit being equal.

FULTON LECHNER.